(12) United States Patent
Li et al.

(10) Patent No.: US 9,901,235 B2
(45) Date of Patent: Feb. 27, 2018

(54) AUTONOMOUS ROBOTIC DEVICE CAPABLE OF VACUUM CLEANING AND PURIFYING AIR

(71) Applicant: EGENPOWER INC., Laguna Niguel, CA (US)

(72) Inventors: Gary Li, Dong Guan (CN); Yao-Hsi Chiu, Taichung (TW)

(73) Assignee: EGENPOWER INC., Laguna Niguel, CA (US)

( * ) Notice: Subject to any disclaimer, the term of this patent is extended or adjusted under 35 U.S.C. 154(b) by 0 days.

(21) Appl. No.: 14/966,486

(22) Filed: Dec. 11, 2015

(65) Prior Publication Data

US 2017/0035262 A1    Feb. 9, 2017

(30) Foreign Application Priority Data

Aug. 4, 2015  (TW) .............................. 104125185 A

(51) Int. Cl.
| | |
|---|---|
| A47L 9/28 | (2006.01) |
| A47L 7/04 | (2006.01) |
| A47L 11/40 | (2006.01) |
| F24F 3/16 | (2006.01) |

(52) U.S. Cl.
CPC .............. *A47L 9/2836* (2013.01); *A47L 7/04* (2013.01); *A47L 11/4097* (2013.01); *F24F 3/1603* (2013.01); *A47L 2201/00* (2013.01); *F24F 2003/1614* (2013.01); *F24F 2221/18* (2013.01); *F24F 2221/42* (2013.01)

(58) Field of Classification Search
CPC ...... A47L 9/2836; A47L 7/04; A47L 11/4097; A47L 2201/00; A47L 9/28; F24F 3/1603; F24F 2221/42; F24F 2221/18; F24F 2003/1614
See application file for complete search history.

(56) References Cited

U.S. PATENT DOCUMENTS

| | | | |
|---|---|---|---|
| 8,458,849 B2 | 6/2013 | Chiu | |
| 8,680,816 B2 | 3/2014 | Li | |
| 2016/0278593 A1* | 9/2016 | Lee | ........................ F24F 3/1603 |

FOREIGN PATENT DOCUMENTS

| | | | |
|---|---|---|---|
| KR | 2007099275 | * | 10/2007 |
| KR | 20070099275 | * | 10/2007 |
| KR | 2009114028 | * | 11/2009 |

* cited by examiner

*Primary Examiner* — David Redding
(74) *Attorney, Agent, or Firm* — Muncy, Geissler, Olds & Lowe, P.C.

(57) ABSTRACT

An autonomous robotic device capable of vacuum cleaning and purifying air includes an autonomous robotic vacuum cleaner for moving autonomously and vacuum cleaning, and an air purifier. The autonomous robotic vacuum cleaner has a power supply and a top surface provided with a plurality of positioning members. The air purifier has an air inlet, an air outlet, and a plurality of matching members at the bottom thereof. The air purifier is detachably disposed on the autonomous robotic vacuum cleaner in a way that the matching members are in contact with the positioning members to create a positioning relationship for positioning the air purifier on the autonomous robotic vacuum cleaner, and an electrical connection to enable the air purifier to receive electric power from the power supply of the autonomous robotic vacuum cleaner.

6 Claims, 4 Drawing Sheets

AUTONOMOUS ROBOTIC DEVICE CAPABLE OF VACUUM CLEANING AND PURIFYING AIR

BACKGROUND

1. Technical Field

The present invention relates to an autonomous robotic vacuum cleaner, and more particularly, to an autonomous robotic device capable of vacuum cleaning and purifying air.

2. Description of Related Art

An autonomous robotic vacuum cleaner is a well-known intelligent vacuum cleaner capable of moving autonomously, which can automatically detect and avoid obstacles, and perform predefined path logic to move in a room with a very high coverage rate, so as to clean the room by moving autonomously and sucking up dust and dirt. For example, U.S. Pat. No. 8,458,849 and U.S. Pat. No. 8,680,816 both disclose a kind of autonomous robotic vacuum cleaner.

However, the currently existing autonomous robotic vacuum cleaners are only capable of vacuum cleaning, but have no extra function of purifying air. However, the gas discharged by the working vacuum cleaner sometimes blows and raises the dust on the area not cleaned yet, and that makes the user feel uncomfortable. If the autonomous robotic vacuum cleaner can be equipped with an extra air purifier, the air quality can be improved by the air purifier while the vacuum cleaner is working, and the user will feel more comfortable. Because the air quality is getting worse and worse in recent years, the air purifier is a necessary device for people's health.

SUMMARY

A primary objective of the present invention is to provide an autonomous robotic device capable of moving autonomously, vacuum cleaning, and selectively providing the air purifying function upon the user's requirement.

Another objective of the present invention is to provide an autonomous robotic device capable of vacuum cleaning and purifying air, and the user can conveniently activate the air purifying function of the autonomous robotic device only by assembling the device in an easy way of placing an air purifier on an autonomous robotic vacuum cleaner.

To achieve the above-mentioned objectives, the present invention provides an autonomous robotic device capable of vacuum cleaning and purifying air, which includes an autonomous robotic vacuum cleaner and an air purifier. The autonomous robotic vacuum cleaner is adapted for moving autonomously and vacuum cleaning, and has a power supply. The air purifier has an air inlet and an air outlet, and the air purifier is provided therein with a blower and a filter. Air is driven by the blower to enter the air purifier through the air inlet, be filtered through the filter, and then be vented out of the air purifier through the air outlet. The autonomous robotic vacuum cleaner has a top surface provided with a plurality of positioning members. The air purifier is provided at a bottom thereof with a plurality of matching members for matching the positioning members. The air purifier is detachably disposed on the autonomous robotic vacuum cleaner in a way that the matching members are in contact with the positioning members to create a positioning relationship for positioning the air purifier on the autonomous robotic vacuum cleaner, and an electrical connection to enable the air purifier to receive electric power from the power supply of the autonomous robotic vacuum cleaner.

In this way, the autonomous robotic device of the present invention is capable of moving autonomously, vacuum cleaning, and selectively providing the air purifying function upon the user's requirement. When the air purifying function is required, the user can conveniently activate it only by assembling the autonomous robotic device in an easy way of placing the air purifier on the autonomous robotic vacuum cleaner.

DESCRIPTION OF THE EXEMPLARY EMBODIMENTS

The technical features of the present invention will be fully understood from the detailed description of the preferred embodiment given herein below and the accompanying drawings.

Figure 1:
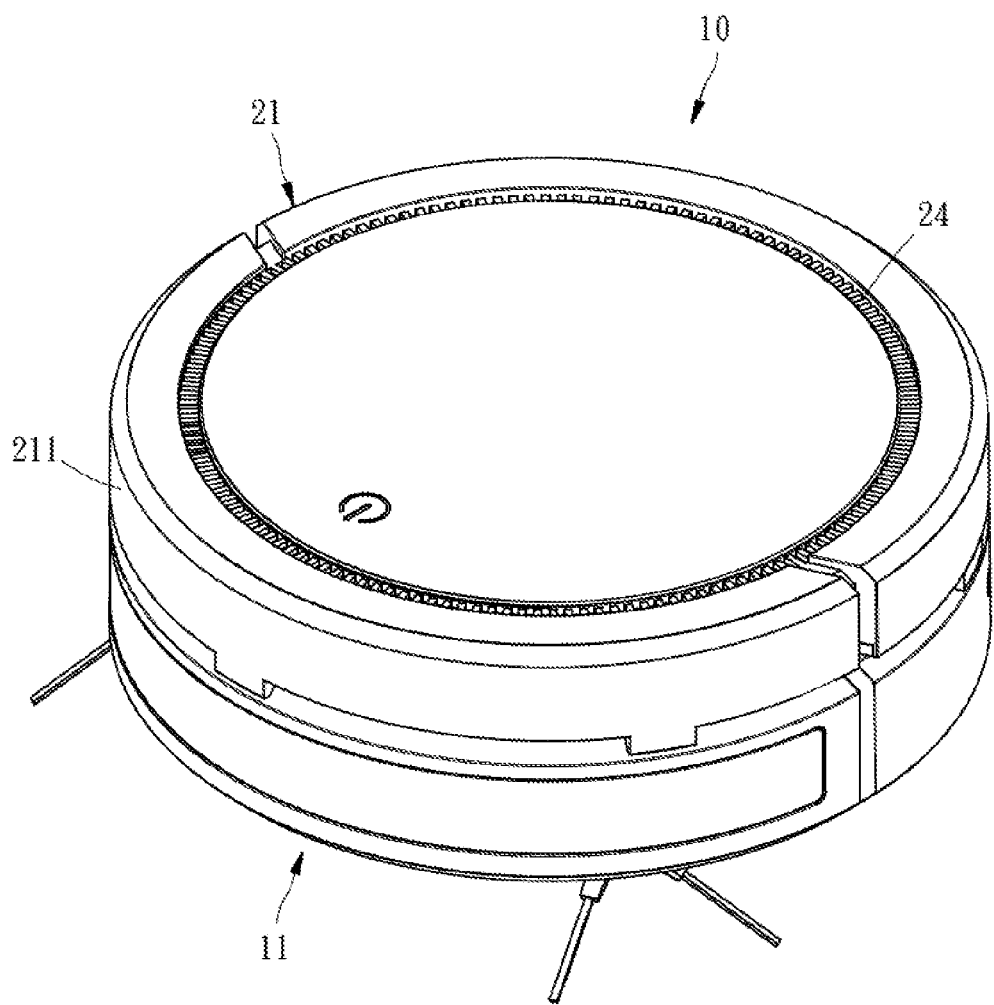
FIG. 1 is an assembled perspective view of a first preferred embodiment of the present invention.
Figure 2:
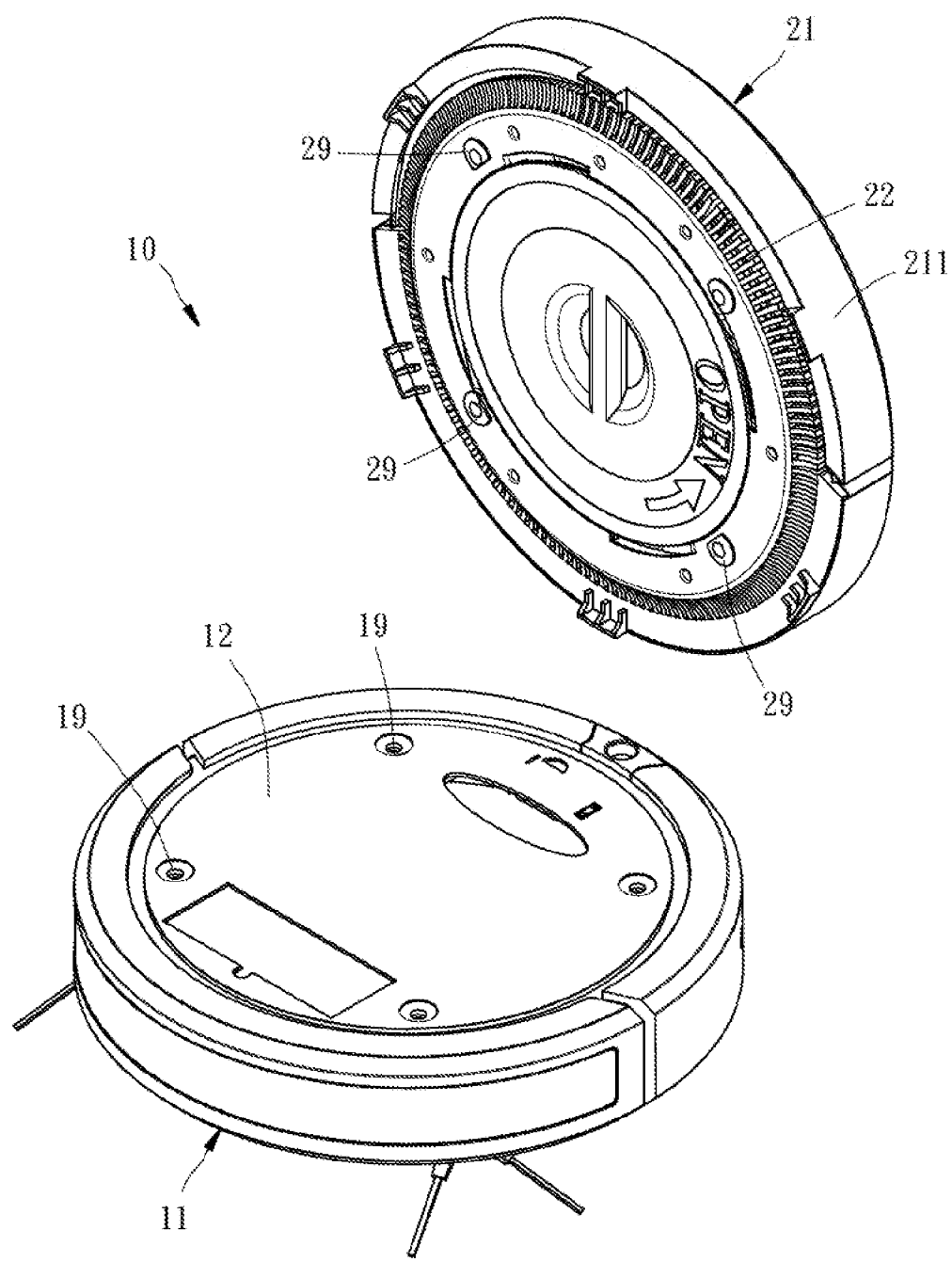
FIG. 2 is an exploded perspective view of the first preferred embodiment of present invention.
Figure 3:
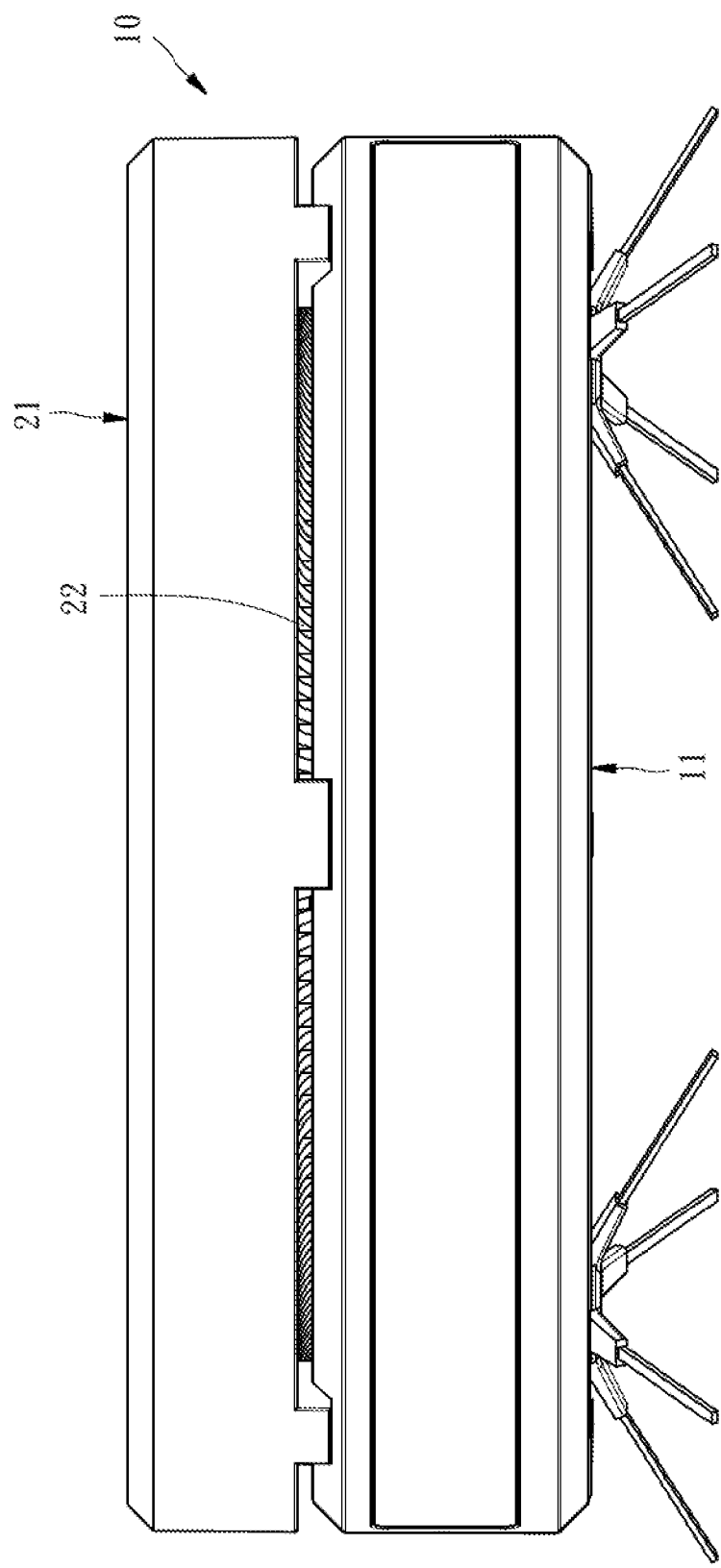
FIG. 3 is a front view of the first preferred embodiment of the present invention.
Figure 4:
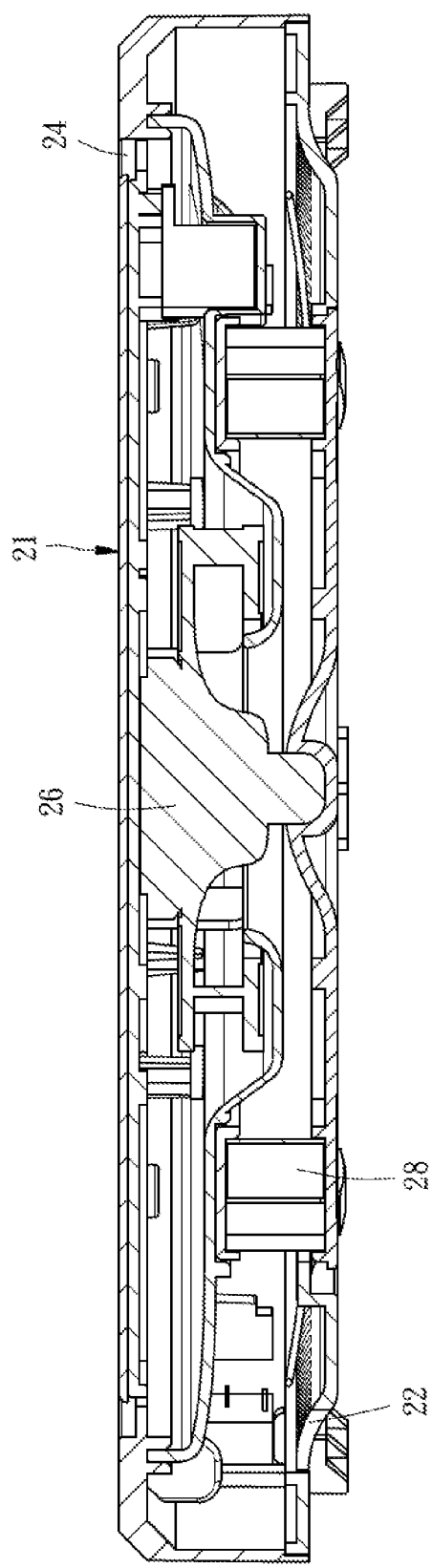
FIG. 4 is a sectional view of a part of the first preferred embodiment of the present invention, illustrating the interior structure of an air purifier.

Referring to FIGS. 1-4, an autonomous robotic device 10 capable of vacuum cleaning and purifying air according to a preferred embodiment of the present invention includes an autonomous robotic vacuum cleaner 11 and an air purifier 21.

The autonomous robotic vacuum cleaner 11 is adapted for moving autonomously and vacuum cleaning, and has a power supply (not shown). In this embodiment, the power supply is a battery. The autonomous robotic vacuum cleaner 11 is a conventional apparatus and the battery disposed therein is also well-known by people skilled in this art, so their details are not illustrated in drawings. The collision detection and avoidance functions of the autonomous robotic vacuum cleaner 11 are also conventional technologies, so their detailed descriptions are omitted. The autonomous robotic vacuum cleaner 11 has a top surface 12 provided with a plurality of positioning members 19.

The air purifier 21 has an air inlet 22 and an air outlet 24, and the air purifier 21 is provided therein with a blower 26 and a filter 28. Air is driven by the blower 26 to enter the air purifier 21 through the air inlet 22, be filtered through the filter 28 and then vented out of the air purifier 21 through the air outlet 24. In this embodiment, the air inlet 22 is located at the bottom of the air purifier 21, and the air outlet 24 is located at the top of the air purifier 21. In addition, the air inlet 22 and the air outlet 24 are annular-shaped. The air purifier 21 can perform the air purifying function no matter the air inlet 22 and the air outlet 24 are located at the bottom or the top of the air purifier 21. However, the air purifier 21 is located over the autonomous robotic vacuum cleaner 11, and the air discharged by the autonomous robotic vacuum cleaner 11 may contain small dust unable to be filtered out by the filter 28 of the vacuum cleaner 21. Therefore, the air inlet 22 is preferably located at the bottom of the air purifier 21, thereby closest to the autonomous robotic vacuum cleaner 11, so as to directly suck the air discharged by the autonomous robotic vacuum cleaner 11 and purifying it; the air outlet 24 is preferably located at the top of the air purifier 21, thereby capable of preventing the air just purified and discharged upwardly by the air purifier 21 from being quickly sucked back into the air purifier 21 through the air inlet 22 located at the bottom of the air purifier 21, so as to avoid unnecessary purification of clean air. Resulted from the feature that the air inlet 22 and the air outlet 24 are annular-shaped, the air purifying function of the air purifier 21 is not limited in direction.

The air purifier 21 is provided at the bottom thereof with a plurality of matching members 29 for matching the positioning members 19. The air purifier 21 is detachably disposed on the autonomous robotic vacuum cleaner 11 in a way that the matching members 29 are in contact with the positioning members 19 to create a positioning relationship and an electrical connection therebetween. The positioning relationship is adapted for positioning the air purifier 21 on the autonomous robotic vacuum cleaner 11, and the electrical connection enables the air purifier 21 to receive electric power from the power supply of the autonomous robotic vacuum cleaner 11. In this embodiment, one of the positioning member 19 and the matching member 29 is a magnet, and the other is made of magnet-attractable material, so that the matching members 29 are positioned on the positioning members 19 respectively by magnetic attraction. Besides, the positioning members 19 and the matching members 29 may be all made of metal, so that the electrical connection can be created by the matching members 29 contacting the positioning members 19 respectively.

In addition, the air purifier 21 has a collision detection device 211 electrically connected to the matching members 29 for converting the detected collisions into electric signals and transmitting the electric signals to the autonomous robotic vacuum cleaner 11 through the electrical connection between the matching members 29 and the positioning members 19. The collision detection device 211 is a well-known element to be equipped on the autonomous robotic vacuum cleaner 11, but unprecedented to be equipped on the air purifier 21.

The above description illustrates the structure of this embodiment, and the operation of this embodiment is described below.

Referring to FIGS. 1-4, before in use the air purifier 21 is placed on the autonomous robotic vacuum cleaner 11 in a way that the positioning members 19 are in contact with the matching members 29 respectively, so that the air purifier 21 is positioned on the autonomous robotic vacuum cleaner 11 by the magnetic attraction between the positioning members 19 and the matching members 29, and able to receive the electric power from the power supply of the autonomous robotic vacuum cleaner 11 through the electrical connection between the positioning members 19 and the matching members 29, so as to perform the air purifying function. While the device 10 is working, if the collision detection device 211 detects a collision, it will transmit the electric signal corresponding to the collision to the autonomous robotic vacuum cleaner 11, thereby enabling the autonomous robotic vacuum cleaner 11 to avoid the collision. Because the air purifier 21 is placed over the autonomous robotic vacuum cleaner 11, when the autonomous robotic device 10 moves to the bottom of a table or a sofa, the autonomous robotic vacuum cleaner 11 may not detect any collision, but the air purifier 21, which is located higher than the vacuum cleaner 11, may be going to collide with the bottom edge of the table or the sofa. At this time, the collision detection device 211 can perform its function to detect the collision. When the autonomous robotic vacuum cleaner 11 stops moving but its power supply still contains electric power, the air purifier 21 can still work by receiving the electric power from the power supply of the autonomous robotic vacuum cleaner 11.

When the air purifier 21 is not required, the user can dismount the air purifier 21 from the autonomous robotic vacuum cleaner 11. At this time, the autonomous robotic vacuum cleaner 11 is selectable to perform the vacuum cleaning function alone upon the user's requirement.

As above-mentioned, the autonomous robotic device 10 of the present invention is capable of not only moving autonomously and vacuum cleaning, but also selectively providing the air purifying function upon the user's requirement. Besides, when the air purifier 21 is required, the user can conveniently activate it only by assembling the device 10 in an easy way of placing the air purifier 21 on the autonomous robotic vacuum cleaner 11.

In addition, the air purifier 21 can be further equipped with a power connector for being electrically connected with supply mains directly or through a transformer capable of transforming AC power to DC power. In this way, even if the air purifier 21 is not placed on the autonomous robotic vacuum cleaner 11, the air purifier can perform the air purifying function alone by receiving the electric power from supply mains. Because the air purifier 21 can work alone without moving with the autonomous robotic vacuum cleaner 11, the air purifier 21 is not limited to have the collision detection device 211.

What is claimed is:

1. An autonomous robotic device capable of vacuum cleaning and purifying air, comprising:
    an autonomous robotic vacuum cleaner adapted for moving autonomously and vacuum cleaning, and having a power supply; and
    an air purifier having an air inlet and an air outlet, and provided therein with a blower and a filter, air being driven by the blower to enter the air purifier through the air inlet, be filtered through the filter and then be vented out of the air purifier through the air outlet; wherein
    the autonomous robotic vacuum cleaner has a top surface provided with a plurality of positioning members;
    the air purifier is provided at a bottom thereof with a plurality of matching members for matching with the positioning members, and detachably disposed on the autonomous robotic vacuum cleaner in a way that the matching members are in contact with the positioning members to create a positioning relationship for positioning the air purifier on the autonomous robotic vacuum cleaner, and an electrical connection to enable the air purifier to receive electric power from the power supply of the autonomous robotic vacuum cleaner; and
    the air purifier has a collision detection device electrically connected with the matching members for converting detected collisions into electric signals and transmitting the electric signals to the autonomous robotic vacuum cleaner through the electrical connection between the matching members and the positioning members.

2. The autonomous robotic device capable of vacuum cleaning and purifying air according to claim 1, wherein one of each of the positioning members and each of the matching members is a magnet, and the other is made of magnet-attractable material; the matching members are respectively positioned on the positioning members by magnetic attraction.

3. The autonomous robotic device capable of vacuum cleaning and purifying air according to claim 1, wherein the positioning members and the matching members are made of metal, and the electrical connection therebetween is created by the matching members contacting the positioning members respectively.

4. The autonomous robotic device capable of vacuum cleaning and purifying air according to claim 1, wherein the air purifier has a power connector for being electrically connected with supply mains through a transformer.

5. The autonomous robotic device capable of vacuum cleaning and purifying air according to claim 1, wherein the air inlet is located at the bottom of the air purifier, and the air outlet is located at a top of the air purifier.

6. The autonomous robotic device capable of vacuum cleaning and purifying air according to claim 5, wherein the air inlet and the air outlet are annular-shaped.

* * * * *